June 17, 1930.                F. B. EILERS                1,764,097
                      LIQUID DISPENSING APPARATUS
                  Filed Aug. 26, 1926     14 Sheets-Sheet 1
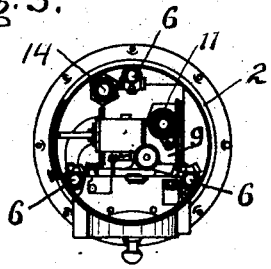
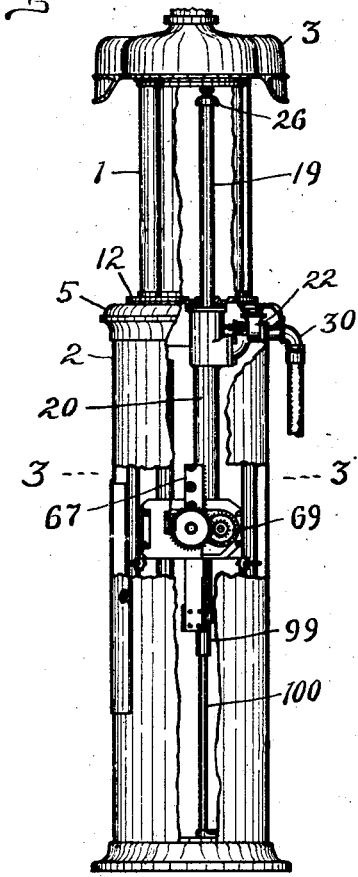
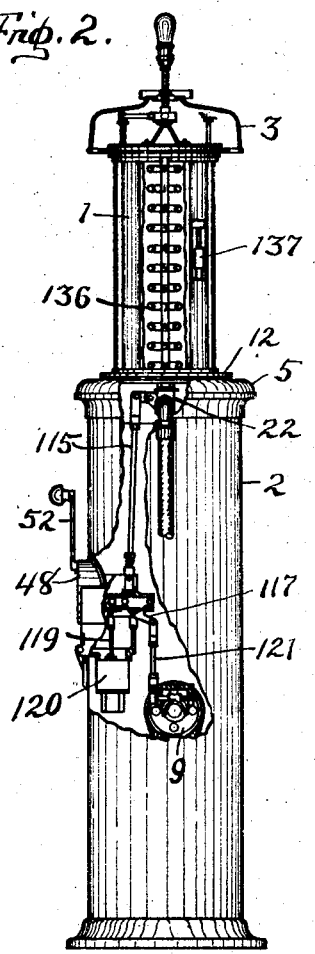
Frank B. Eilers INVENTOR
BY
H. G. Burns ATTORNEY June 17, 1930. F. B. EILERS 1,764,097
LIQUID DISPENSING APPARATUS
Filed Aug. 26, 1926    14 Sheets-Sheet 2

Frank B. Eilers INVENTOR

BY

H. G. Burns ATTORNEY

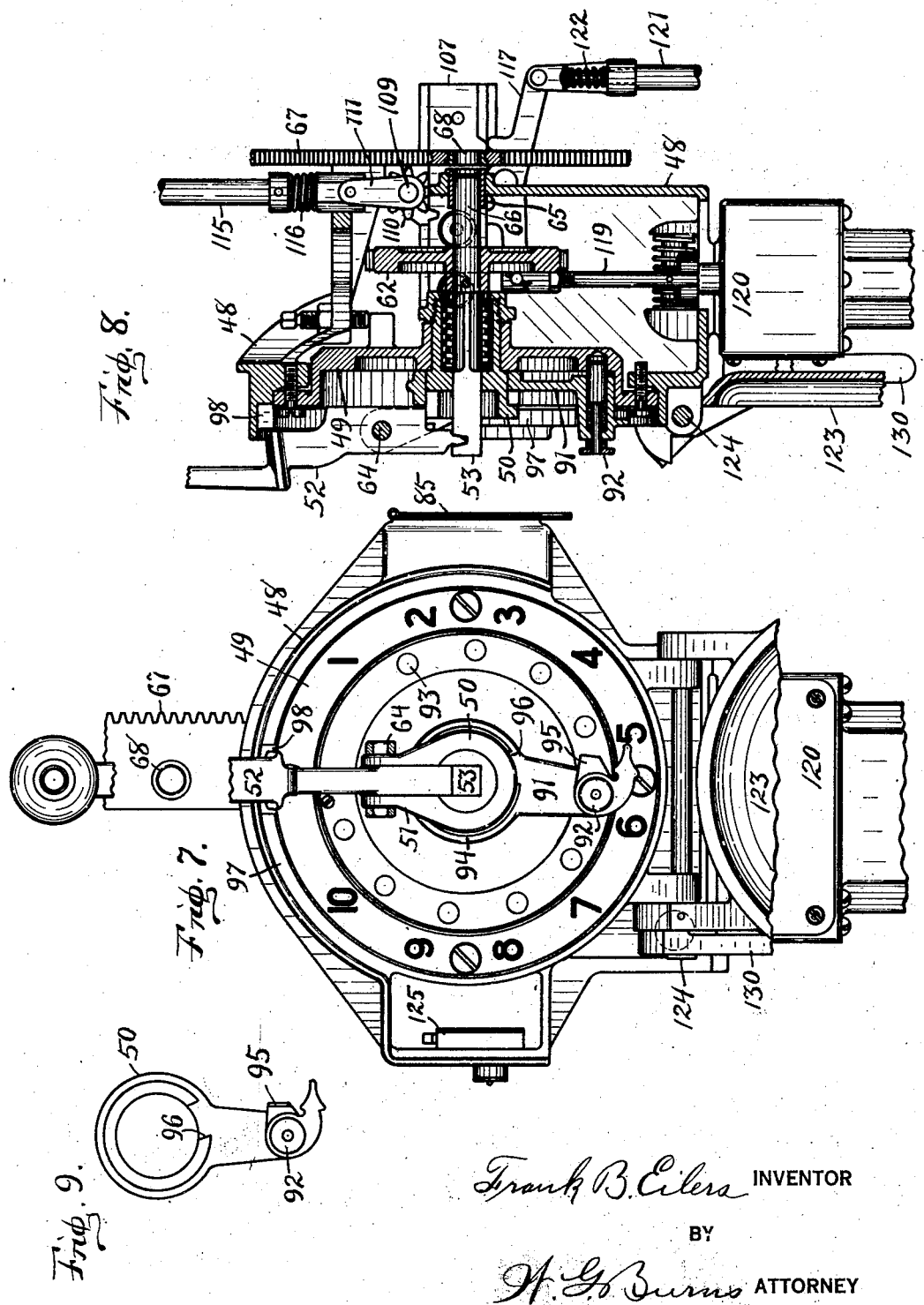

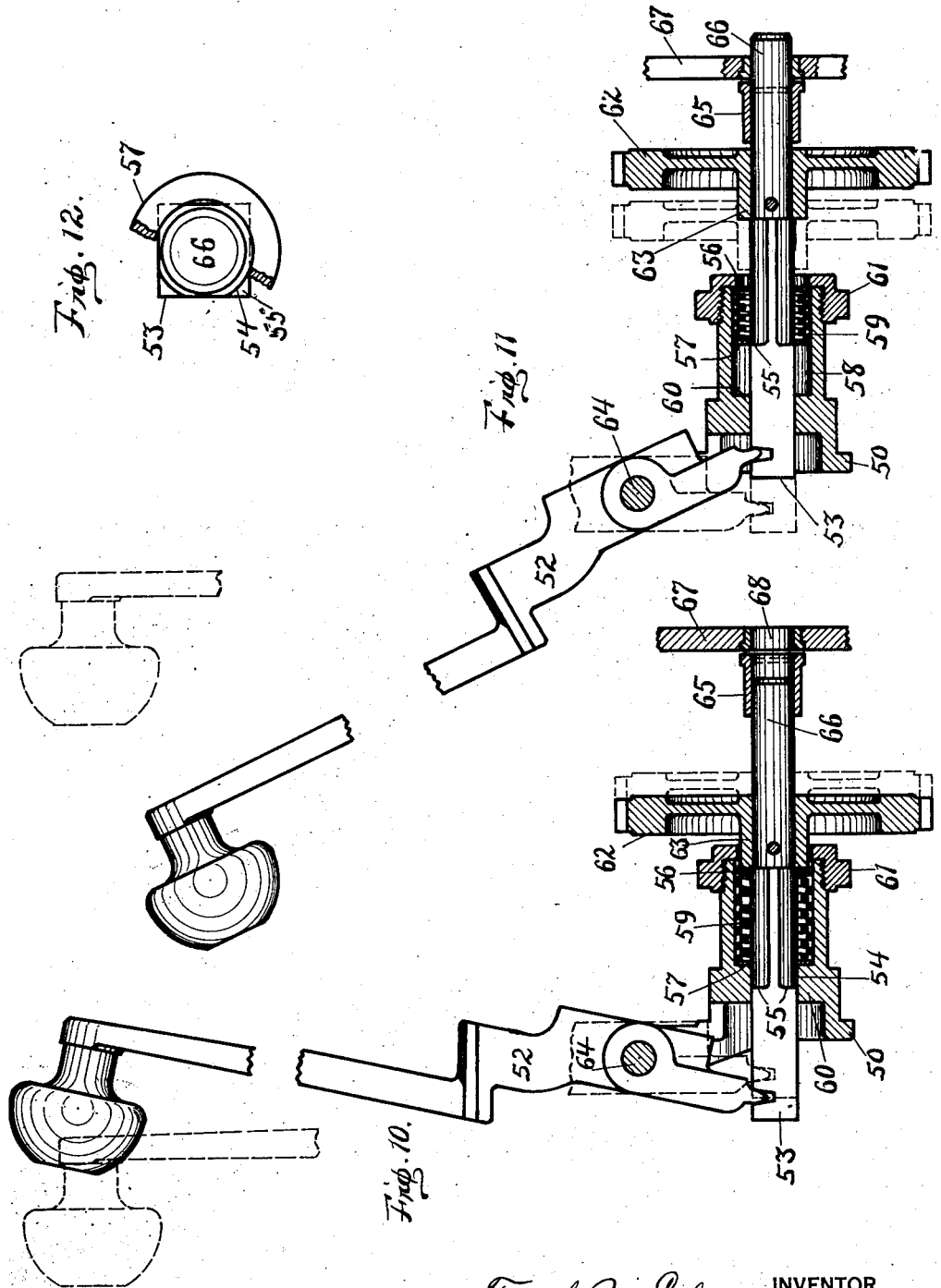

June 17, 1930.    F. B. EILERS    1,764,097
LIQUID DISPENSING APPARATUS
Filed Aug. 26, 1926    14 Sheets-Sheet 5
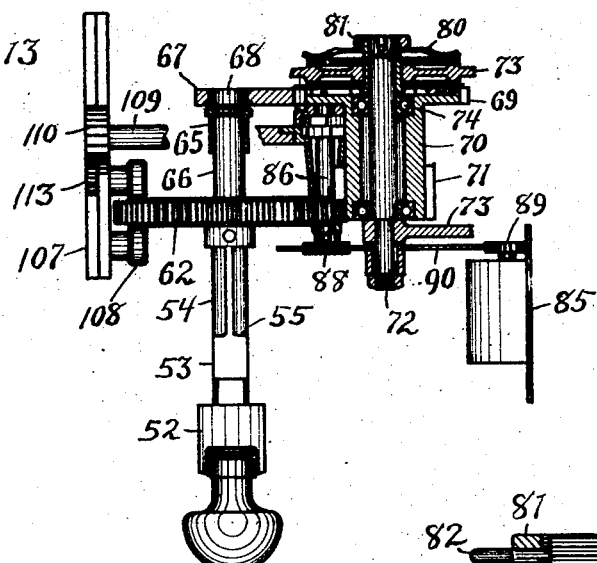
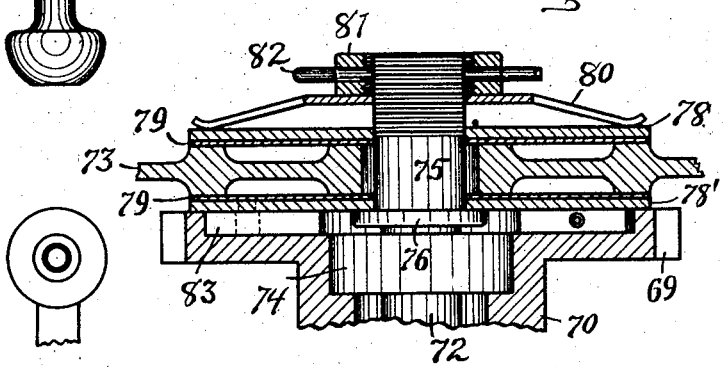
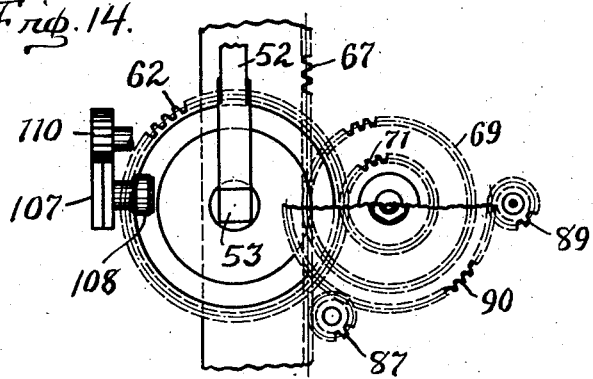
Frank B. Eilers INVENTOR
BY
H. G. Burns ATTORNEY June 17, 1930.  F. B. EILERS  1,764,097
LIQUID DISPENSING APPARATUS
Filed Aug. 26, 1926  14 Sheets-Sheet 6
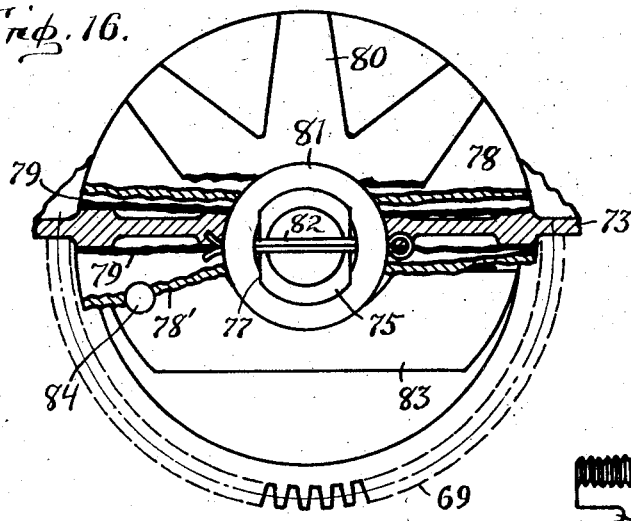
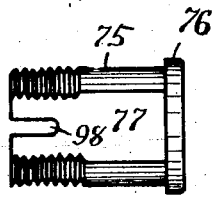
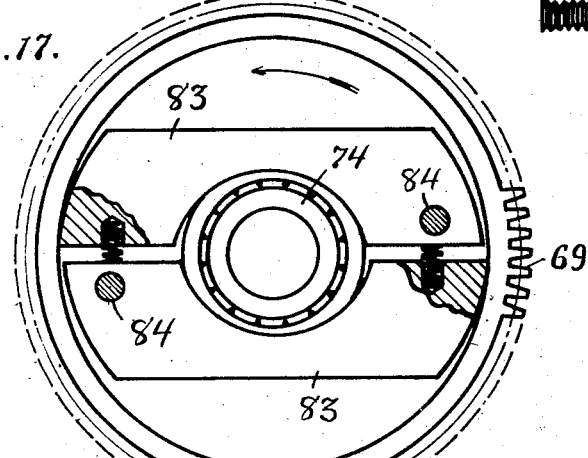
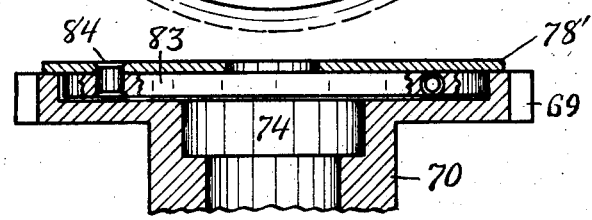
Frank B. Eilers INVENTOR

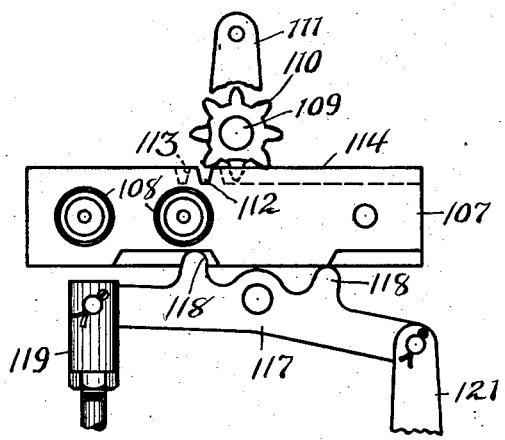
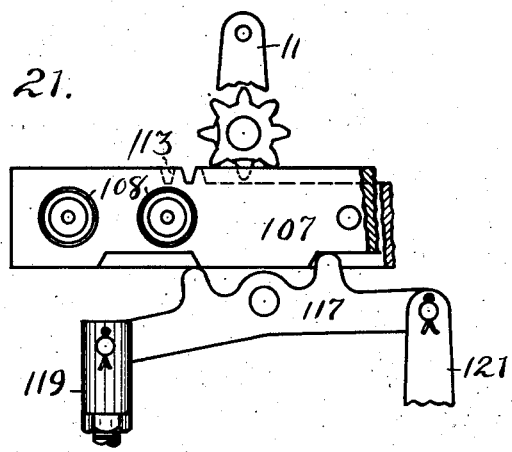
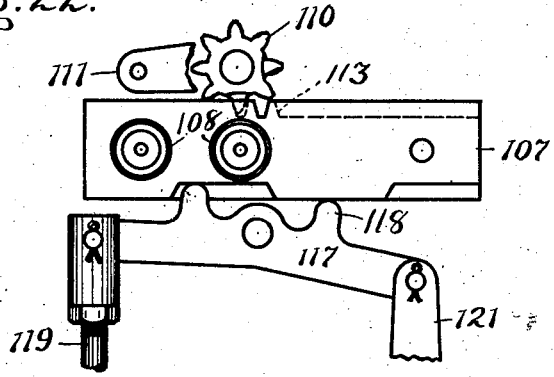

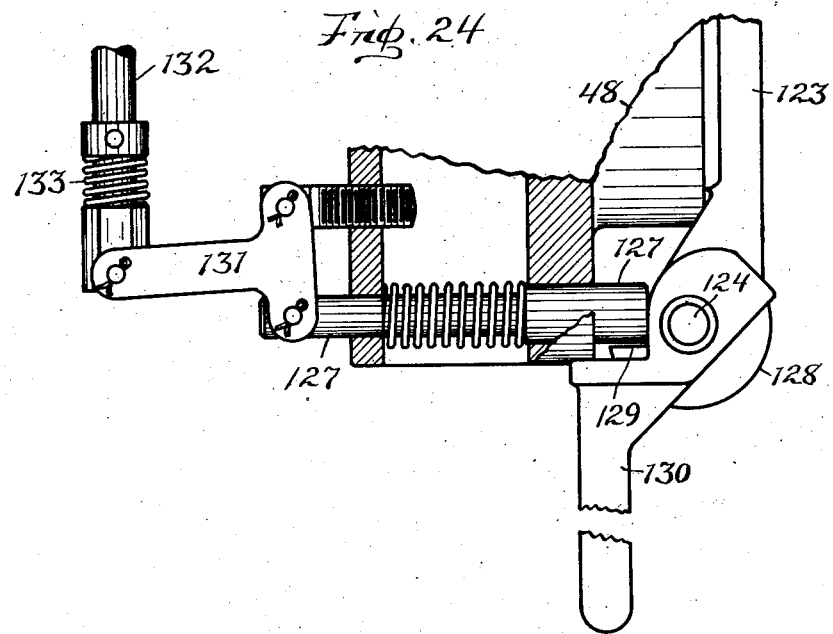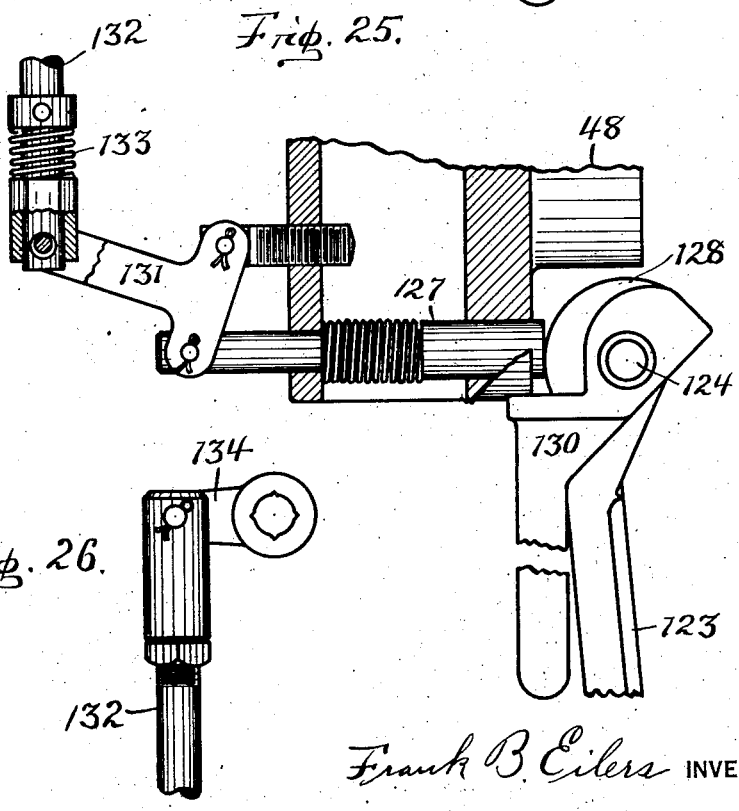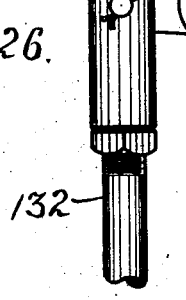

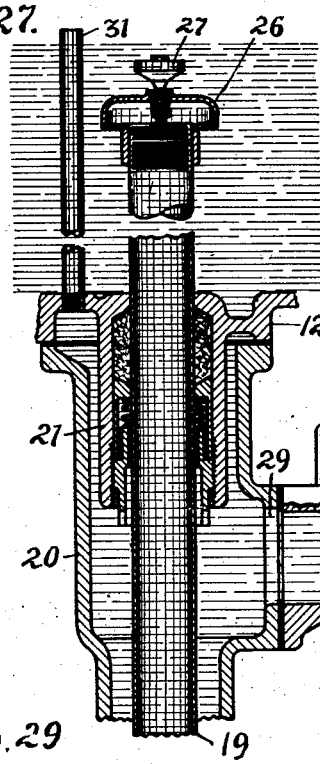
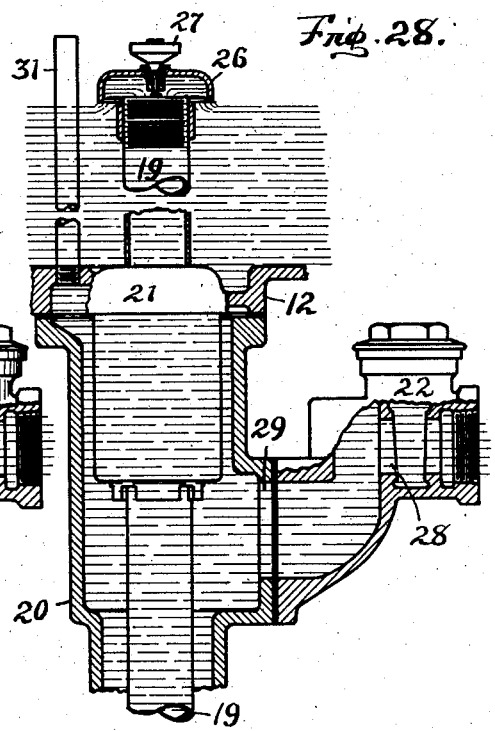
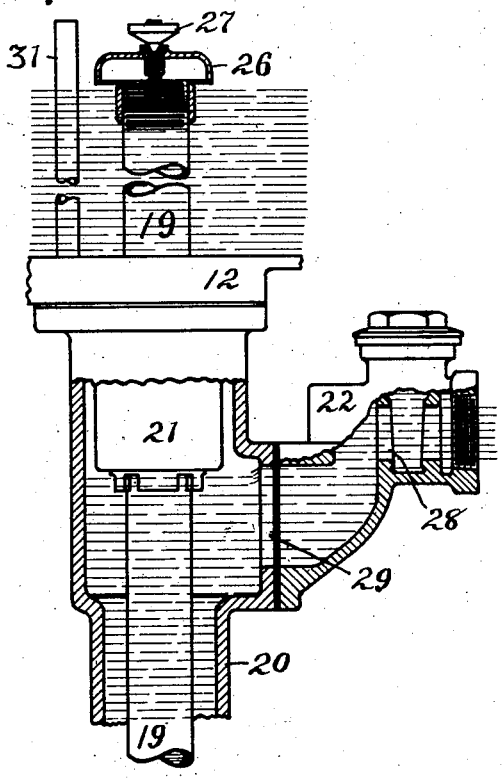
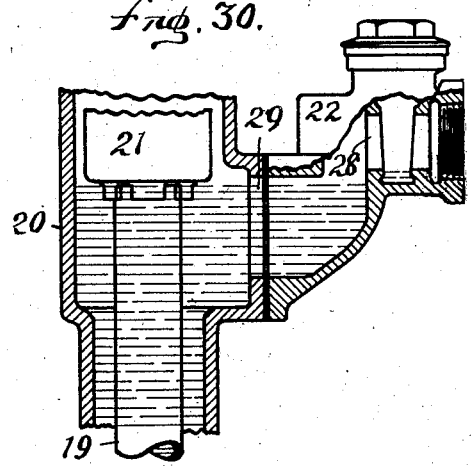

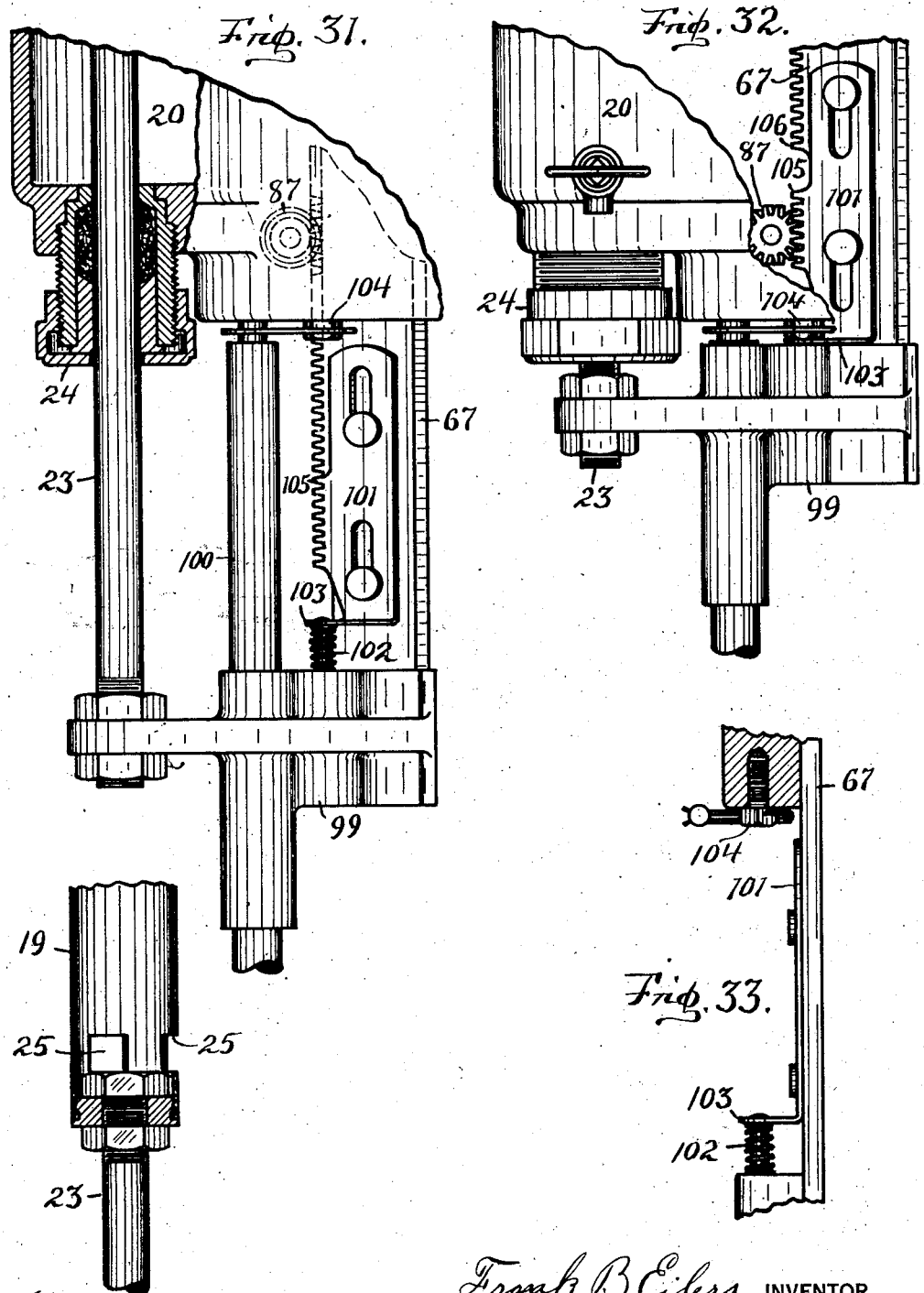

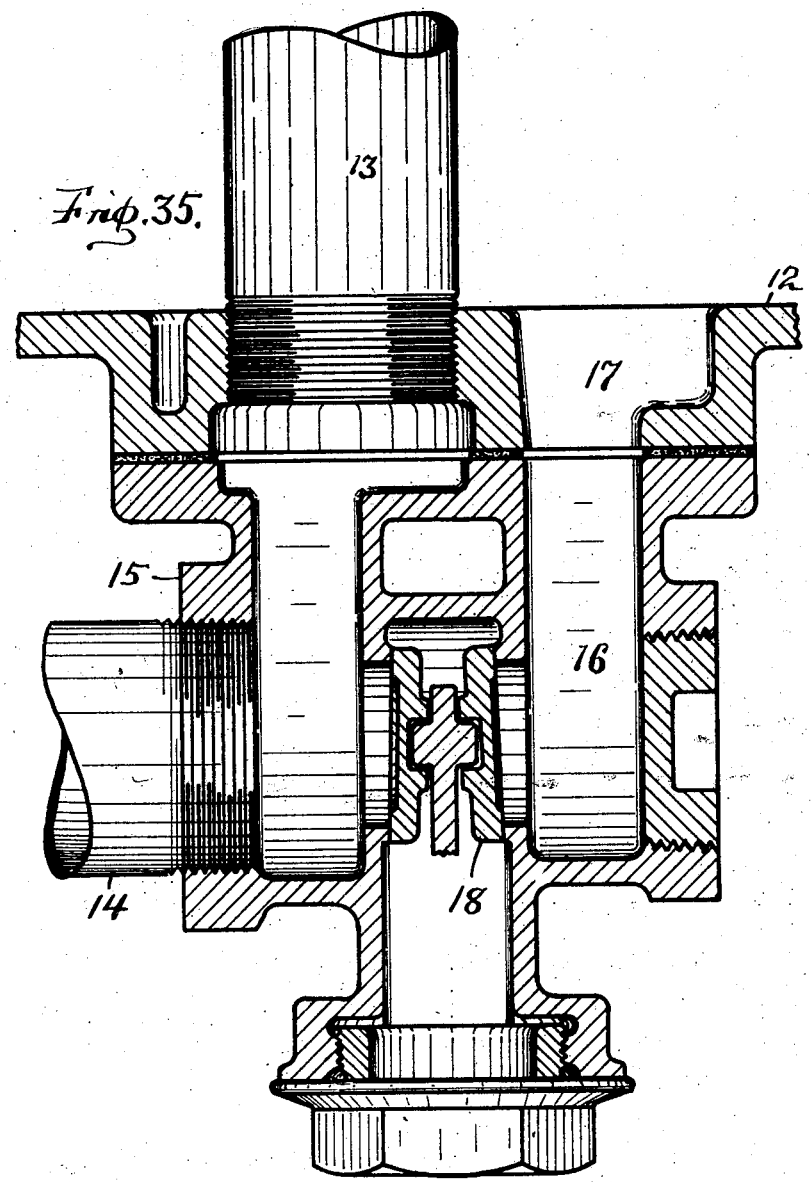

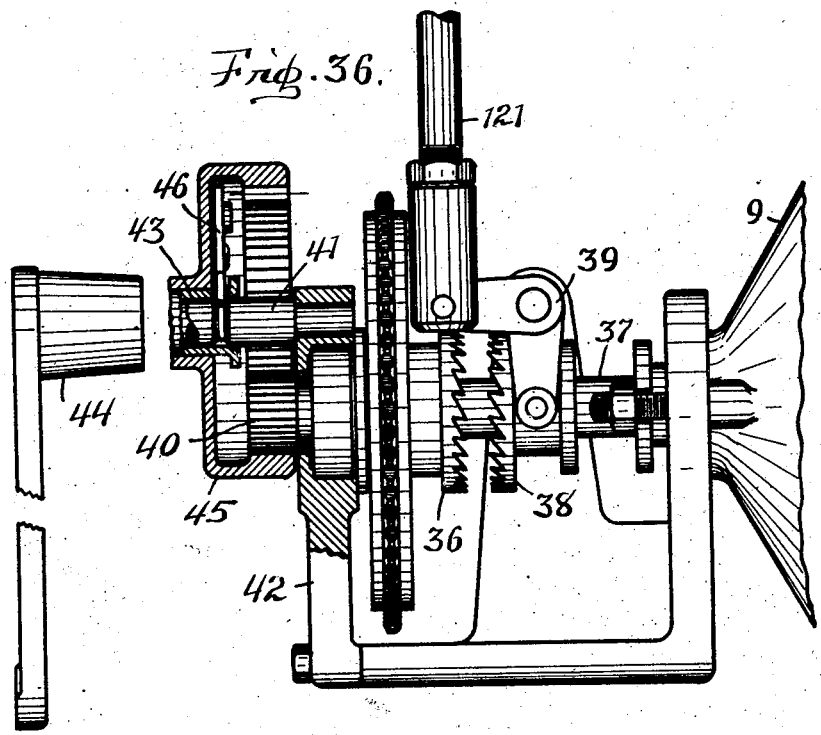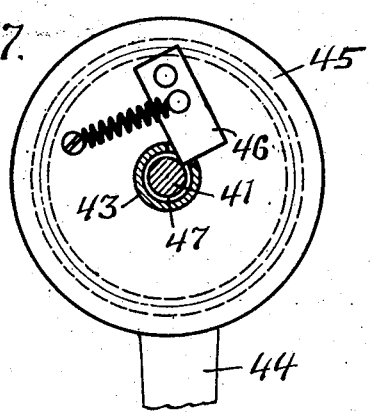

June 17, 1930. F. B. EILERS 1,764,097
LIQUID DISPENSING APPARATUS
Filed Aug. 26, 1926 14 Sheets-Sheet 13

Frank B Eilers INVENTOR
BY
W. G. Burns ATTORNEY

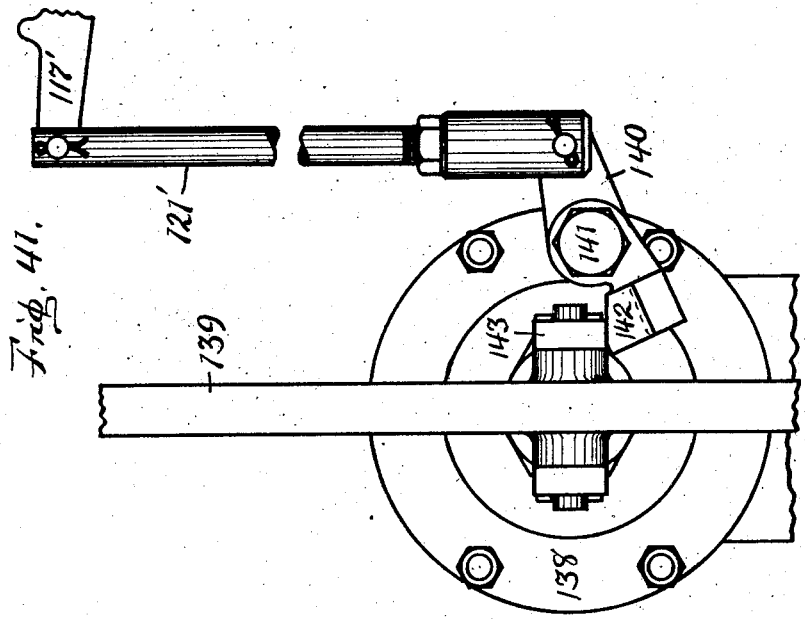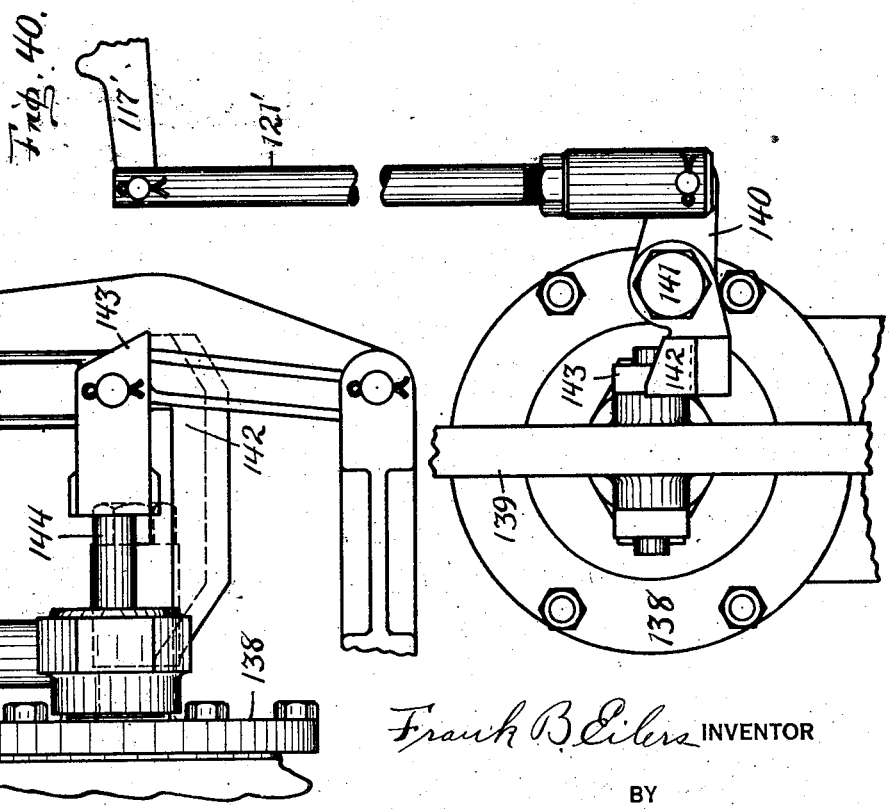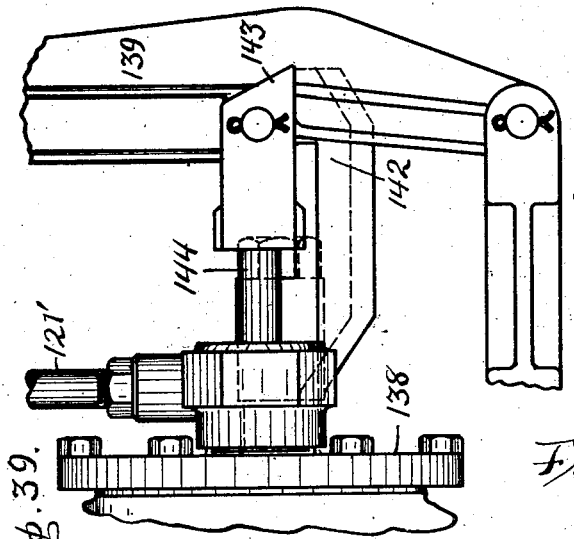

Patented June 17, 1930

1,764,097

UNITED STATES PATENT OFFICE

FRANK B. EILERS, OF FORT WAYNE, INDIANA, ASSIGNOR TO TOKHEIM OIL TANK AND PULP COMPANY, A CORPORATION OF INDIANA

LIQUID-DISPENSING APPARATUS

Application filed August 26, 1926. Serial No. 131,583.

This invention relates to improvements in liquid dispensing apparatus, and particularly to that type of device employed at filling stations for supplying gasoline in predetermined exact quantities, and the objects of the improvement are: first, to provide an unitary member by which the filling, measuring and discharging operations of the dispenser are controlled; second, to provide an operating means for controlling the filling, measuring and discharging operations of the dispenser, so constructed as to prevent more than one of said operation from occurring at a time; third, to provide a simple and effective means for locking the control mechanism of the dispenser; fourth, to provide a drain valve for the measuring vessel controlled by the locking means whereby the vessel is automatically emptied into the underground storage tank when the dispenser is placed out of service; fifth to provide discharge means for the dispenser so constructed as to prevent after-drip when a measured quantity of liquid has been discharged and sixth, to provide in a dispenser having a sliding tube discharge means, a compensating driving means and a meter whereby the meter is actuated only during the movement of the tube while within discharging range.

These objects are accomplished by the construction illustrated in the accompanying drawings, in which:—

Fig. 1 is a front elevation of a dispenser embodying the invention, parts thereof being broken away;

Fig. 2 is a similar elevation in a plane at right angles to that of Fig. 1;

Fig. 3 is a transverse section of Fig. 1 on the line 3—3 thereof;

Fig. 7 is a front elevation of the unitary controller;

Fig. 8 is a section projected from Fig. 7 in a plane at right angles thereto;

Fig. 9 is a detail front view of the stop lever;

Fig. 10 is a detail view showing the operating lever in position for the filling operation;

Fig. 11 is a similar view showing the operating lever in position for the discharging operation;

Fig. 12 is an end view of the operating plunger and a part of the sliding collar thereon;

Fig. 13 is a detail showing a plan view of the operating mechanism, parts being in section;

Fig. 14 is a diagram of the operating mechanism projected from Fig. 13;

Fig. 15 is a detail view upon an enlarged scale showing a horizontal section of the drag and clutch mechanism;

Fig. 16 is a rear end view of Fig. 15, parts being broken away;

Fig. 17 is an end view of the driving gear and clutch mechanism projected from Fig. 16;

Fig. 18 is a projection of Fig. 17 and including one of the friction plates;

Fig. 19 is a side view of the sleeve for the friction drag device;

Fig. 20 is a detail of the actuating mechanism for the filling and discharging means, the parts being shown in neutral position;

Fig. 21 is a similar view showing the parts in position for the filling operation;

Fig. 22 is a similar view showing the parts in position for the discharging operation;

Fig. 23 is an isometric view of the mutilated gear shown in Figs. 20, 21 and 22;

Fig. 24 is a detail view showing the locking means for the door of the controller and the connection for the drain back valve, the door being shown in locked position and the connection in open position;

Fig. 25 is a similar view showing the door in unlocked position and the drain back connection in closed position;

Fig. 26 is a detail view showing the upper end of the connecting rod for the drain back valve;

Fig. 27 is a vertical section of the discharging means including the sliding tube mechanism and dispensing valve, the vacuum cap on the sliding tube being submerged;

Fig. 28 is a similar view showing the vacuum cap emerged and at the stage when the vacuum therein is at the point of breaking;

Fig. 29 is a similar view showing the upper end of the sliding tube projecting above the liquid level in the measure following the break of vacuum in the cap, and showing also the dispensing valve completely filled with liquid which had flowed in previous to the break of vacuum in the valve;

Fig. 30 is a fragmentary portion of Fig. 29 showing the liquid level which has receded from the discharge opening in the dispensing valve following break of vacuum in the valve;

Fig. 31 is a detail view showing the operating head and connecting rod for the sliding tube, and showing also the articulating rack for the meter gearing, the driving pinion being in actuating position;

Fig. 32 is a similar view with the actuating pinion for the meter gearing in inoperative engagement;

Fig. 33 is a fragmentary view projected from Fig. 31 in a plane at right angles thereto, showing the articulating rack;

Fig. 34 is a detail view showing the connection between the lower end of the sliding tube and its connecting rod;

Fig. 35 is a detail showing a section of the drain back valve and overflow pipe connection;

Fig. 36 is a detail view showing the clutch for controlling the pump, and also the hand cranking attachment;

Fig. 37 is a detail view of the driving head of the hand crank;

Fig. 39 is a detail side view showing the locking means for the hand operated pump;

Fig. 40 is a front end view projected from Fig. 39, showing the lock in engaging position; and Fig. 41 is a similar view showing the lock disengaged.

The characters appearing in the description refer to parts shown in the drawings and designated thereon by corresponding characters.

Figure 6:
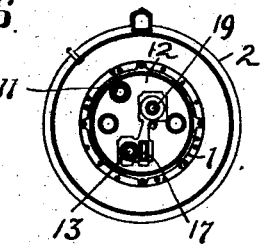
Fig. 6 is a transverse section of Fig. 4 on the line 6—6 thereof.
Figure 4:
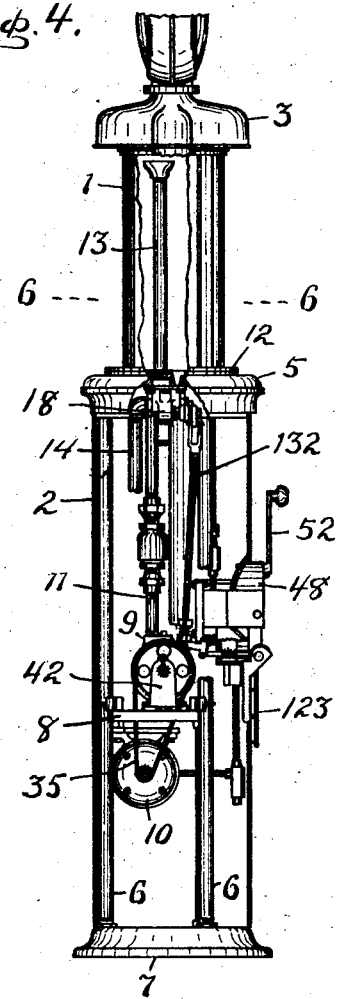
Fig. 4 is an elevation of the dispenser viewed from a view point opposite that of Fig. 2, portions being broken away.
Figure 5:
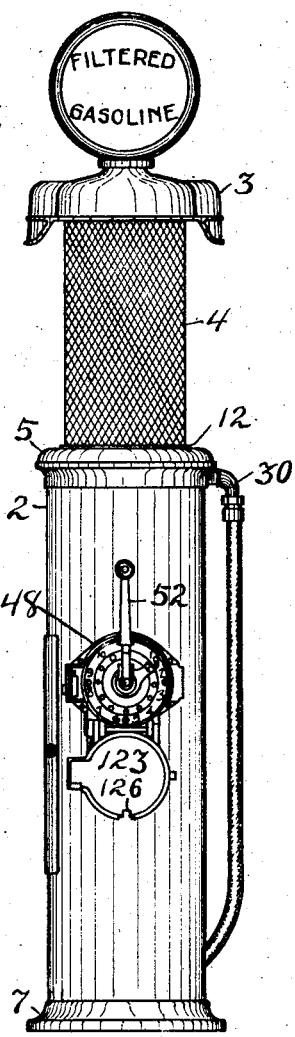
Fig. 5 is a front elevation of the dispenser.

The invention comprises a dispenser having a transparent measuring vessel 1 supported upon a pedestal 2 and surmounted by a dome 3, which vessel is encompassed by a metallic netting 4. The capital 5 of the pedestal is supported on posts 6 that extend upward from the base 7, and said posts afford support also for a horizontal platform 8 within the pedestal upon which is mounted a pump 9, and beneath which is suspended the motor 10 for driving the pump.

The vessel 1 is filled through a supply pipe 11 that extends from the pump 9 and connects with the vessel through its base 12, and an overflow pipe 13 is screwed into the base 12 and has constant communication with a return flow pipe 14 through a connection 15 that is secured to the bottom of the base 12. The connection 15 has therein a cavity 16 that has constant communication with the vessel 1 through a drain opening 17 in the base 12, and a drain valve 18 operable in the connection 15 is disposed so as to control the flow of liquid from the cavity 16 into the return flow pipe 14.

In the dispensing operation the liquid is withdrawn from the vessel 1 through a vertically adjustable gauge tube 19 that extends into a sump 20 that depends from the bottom of the vessel, there being a stuffing box 21 in the top of the sump through which the gauge tube slides. The liquid passing through the gauge tube is discharged from the sump through a dispensing valve 22 connected with the head of the sump. The gauge tube 19 has an actuating rod 23 connected with its lower end, which rod passes through a stuffing box 24 in the bottom of the sump, there being openings 25 in the lower part of the tube 19 for the passage of liquid from the tube into the sump. The quantity of liquid discharged from the vessel upon each dispensing operation is selective, increasing as the gauge tube is lowered in the vessel, and is regulated by the vertical adjustment of the tube accordingly.

A feature of the invention is the means employed whereby after-drip of the liquid passing from the dispensing valve is obviated, such means comprises an inverted cup 26 that extends over the top of the gauge tube 19 with its lower perimeter in a plane slightly lower than the top of the gauge tube so that the tube and the cup form a siphon. The cup has in its top a float valve 27 for venting the cup when submerged, which valve closes upon emergence. Thus, the siphonic action of the liquid passing into the gauge tube is maintained until the level of liquid in the measure (Fig. 28) recedes below the bottom edge of the cup, whereupon the siphon is broken (Fig. 29) by the admission of air into the cup and after-drip of liquid from the vessel into the tube is obviated. The float valve when submerged rises from its seat and thus permits air in the cup and tube to escape so that the liquid freely enters the tube. Also, the valve opening 28 in the dispensing valve 22 is located slightly above the opening 29, in the head of the sump, with which the dispensing valve communicates, so that siphonic action is established in the dispensing valve and the hose connection 30 attached thereto, which action is maintained during the dispensing operation until broken by the admission of air from the sump into the dispensing valve, whereupon the level of liquid recedes (Figs. 29 and 30) to a plane below the opening 28 in the dispensing valve, so that after-drip from the sump through the dispensing valve is obviated. The sump is vented by a pipe 31 that extends up into the vessel to a point above the maximum liquid level therein, so that the liquid flows freely from the sump out through the dispensing valve.

The motor 10 has actuating relation with the pump 9 through the medium of a sprocket chain 35 and clutch mechanism consisting of a driving member 36 mounted loosely on the pump shaft 37 and actuated by said chain, and a toothed member 38 on the shaft having splined relation therewith and engageable with the driving member 36, there being a shifting device 39 for moving the toothed member into and out of engagement with the driving member. The outer end of the pump shaft 37 has fixed thereon a pinion 40, and a stud 41 is mounted in the bracket 42 that supports the outer end of the pump shaft which stud serves as a bearing for the hollow stem 43 of a handcrank 44. Upon the stem 43 of the crank is loosely mounted an internal gear 45 that has engagement with the pinion 40 on the pump-shaft when the crank is positioned on the stud. A spring actuated latch 46 projects loosely through the hollow stem 43 into an annular groove 47 in the stud 41, which latch secures the crank from longitudinal movement on the stud. The internal gear 45 is actuated upon turning of the crank in one direction, and the latch moves out of groove in the stud and is inoperative when the sleeve is turned backward, and thus the hand operating attachment including the crank 44 and gear 45 may be readily disconnected from the stud.

The filling and dispensing operations and the adjusting of the gauge tube are controlled by an unitary mechanism mounted in the pedestal, which mechanism comprises a stationary case 48 positioned in the front of the pedestal and having adjustably mounted therein a circular dial 49 in the axial center of which is supported a revoluble head 50 having at its front end a bifurcated arm 51 in which is fulcrumed an operating lever 52. Positioned axially in the head 50 is a longitudinally movable plunger 53 having actuated relation with the operating lever 52. The forward portion of the plunger is square in cross-section and fits in the head so that it is turned therewith. That portion 54 of the plunger adjacent the front portion is rounded so that shoulders 55 are formed at the juncture of said portions, and upon said rounded portion are loosely mounted a pair of washers 56 and 57 spaced apart and being movable longitudinally in the chamber 58 in said head. A compression spring 59 extends about the plunger between said washers, whereby the washer 57 normally bears against the partition 60 in said head while the washer 56 is held against the cap 61 on the inner end of the head. A driving gear 62 is fixed upon the plunger and is bodily movable therewith, its hub 63 having engagement with the washer 56 when the plunger is drawn forward, so that the forward movement of the plunger is thereby resisted by the action of the spring 59. When the plunger is moved inward the shoulders 55 thereon have engagement with the washer 56 so that the inward movement of the plunger is resisted by the action of said spring. In this manner the plunger is normally held in a neutral position respecting its longitudinal movement, and the operating lever 52 is correspondingly sustained in a neutral position respecting its movement on its fulcrum 64.

The rear end of the plunger 53 has a sliding movement in a guide 65 fixed in the rear wall of the case 48 and constitutes a centering pin 66 for the rack-bar, which bar has spaced apertures 68 in which the pin is projected upon inward movement of the plunger, respectively as the apertures register with the guide 65, and in this manner the rack-bar is sustained in accurate positions of adjustment.

The driving gear 62 has actuating relation with the rack-bar through the medium of a counter gear 69 that meshes with the rack and has on its hub 70 an annular series of teeth 71 that mesh with the driving gear 62. The teeth 71 are of sufficient width as to remain in mesh with the driving gear throughout its longitudinal movement. The hub 70 is mounted upon a shaft 72 that is supported in the case 48 upon brackets 73 therein, there being ball bearings 74 provided on the shaft for the hub.

A friction brake device is provided in conjunction with the counter gear 69 so constructed that the downward movement of the rack bar is resisted while permitting freedom of movement during the upward stroke thereof. The friction device comprises a sleeve 75 rotatably mounted upon the rear end of the shaft 72 and extending loosely through the corresponding bracket 73. Said sleeve has at one end an external flange 76 and has flat sides 77, its end opposite the flange having slots 98 made therein. Upon said sleeve are mounted a pair of discs 78 and 78' spaced apart and with the corresponding bracket 73 extending therebetween, and between each disc and the adjacent face of the bracket 73 is interposed a chafing-plate 79, the openings in all of said plates being shaped to conform with the flat faces 77 of the sleeve so as to turn with the sleeve. A spider 80 made of spring plate metal is mounted on the sleeve 75 and bears against the adjacent plate 78, and a collar 81 is threaded on the outer end of the sleeve and bears against the spider, the collar being held in adjusted position by a cotter-pin 82 that extends through the collar and the slots 98 in the sleeve. The flange 76 on the sleeve 75 engages the innermost plate 78' so that when the collar 81 is tightened against the spider, said plates are clamped against the bracket 73 with more or less pressure. A pair of spring pressed dogs 83 are mounted upon corresponding pivots 84 that project from the plate 78, the dogs being oppositely disposed and each having clutching relation with the counter-gear 69 so that when the counter gear is rotated in one direction and the rack thereby lowered, the sleeve 75 together with the friction plates will be rotated through the medium of the dogs, and cause frictional resistance that tends to counteract the weight of the rack and parts connected therewith. When the counter gear is turned in the opposite direction, and the rack bar thereby elevated, the dogs become inoperable and admit of unrestrained movement of the counter gear.

A meter 85 is provided in the case 48 and operatively connected with the rack-bar 67 for registering the extent of the downward travel of the rack bar. A ratchet mechanism 86 is mounted in the case and has an actuating pinion 87 that meshes with the rack bar and has also a pinion 88 from which movement is imparted to the meter pinion 89 through the medium of a gear wheel 90 that is loosely mounted upon the projecting end of the shaft 72. The ratchet mechanism 86 may be of any suitable construction in common use capable of operation upon downward movement of the rack bar and which will idle during upward movement thereof. The particular construction of the ratchet mechanism being immaterial to the invention is not herein shown in detail, and is referred to hereinafter as the meter gearing.

An adjustable stop 91 is mounted upon the front end of the head 50 so as to have turning movement thereon and is provided with a spring pressed centering pin 92 that has engagement selectively with spaced apertures 93 that are made in the dial 49, accordingly as the stop is adjustably turned. The stop has engagement with the operating lever 52 when said lever is turned upon the axis of the rotatable head 50, and the turning movement thereof is thereby limited according to the adjusted position of the stop. The apertures 93 in the dial are so located that when the stop is adjusted with its centering pin in any one of said apertures 93 and the operating handle is turned into contact with the stop, the rack bar 67 will be accordingly positioned with a corresponding one of its apertures 68 in registration with the guide 65 so as to receive the centering pin 66. The stop 91 has a concentric forwardly projecting flange 94 against which the inner end portion of the operating lever 52 bears so that inward movement of the inner end of the lever and the plunger 53 actuated thereby is prevented except when the operating lever is in position against the abutment 95 on the stop, there being a recess 96 in the flange so located as to receive the said end portion of the lever and admit inward movement thereof. The case 48 has also a flange 97 surrounding the dial, against which the operating lever 52 bears so that outward movement of the plunger 53 by said lever is prevented except when said lever is in its uppermost position, there being a recess 98 in said flange to admit movement of said lever when in uppermost position so that the plunger may be actuated thereby accordingly.

The rack bar 67 is secured rigidly at its lower end to a cross head 99 that has guided movement on a vertical rod 100 fixed in the pedestal, and said cross head has rigid connection with the actuating rod 23 of the adjustable gauge tube 19, so that as the rack bar is actuated the gauge is raised or lowered accordingly which is accomplished by turning the operating lever 52 upon the axis of the rotatable head.

A feature of the invention is the articulating device by which the meter gearing is thrown out of action when the top of the gauge tube is raised above the liquid overflow level in the vessel, and is again thrown into action as the top of the tube recedes below the overflow level, the purpose being to confine operation of the meter to that portion of the travel of the gauge tube when discharge of liquid from the vessel through the gauge tube takes place. This device consists of an auxiliary rack 101 having limited vertical sliding movement on the rack bar 67 and being sustained in its uppermost position by a compression spring 102 situated in the cross head 99 and acting against the foot 103 of the auxiliary rack. An adjustable screw stop 104 is disposed in the path of the foot 103 so that when the rack bar is raised to its uppermost position the auxiliary rack is arrested by the contact of its foot with the stop, and remains stationary during the completion of the upward stroke of the rack-bar. The uppermost tooth 105 on the auxiliary rack when in normal position (Fig. 31) is alined with the lowermost tooth 106 on the rack bar 67 so that articulation between the driving pinion 87, for the meter gearing, is maintained with the rack-bar and the auxiliary rack respectively in passing from engagement with the teeth of the rack bar to the teeth of the auxiliary rack, and vice-versa. During the period of arrest of the auxiliary rack, the driving pinion 87 remains inoperative and in this manner operation of the meter is accordingly limited. By adjustment of the screw stop 104, that stage in the action of the auxiliary rack when it has contact with the stop may be made to occur as the top of the gauge tube reaches a plane corresponding with the overflow level in the vessel.

Another feature of the invention consists in the means whereby the pumping means for filling the vessel, and the dispensing valve for the discharge of liquid from the vessel are controlled by the operating lever 52. This mechanism (Figs. 20 to 23) comprises a reciprocable cam member 107 slidably mounted in the case 48 and provided with a pair of spaced rollers 108 between which the driving gear 62 extends and by which longitudinal movement is imparted to said cam member when the plunger 53 is moved endwise. A crankshaft 109 is rotatably mounted in the case 48 and has fixed thereon a mutilated gear 110 and a crank arm 111, and the cam member has in its upper edge a notch 112 and adjacent teeth 113 (Figs. 13 and 14) so arranged as to engage and actuate the mutilated gear when the cam member is moved rearwardly from its neutral position. Also, the cam member has a straight face 114 upon which the mutilated gear bears and by which it is prevented from turning when the cam member is in neutral position and while moved forwardly therefrom. The crank arm 111 has operating relation with the dispensing valve 22 through the medium of a connecting rod 115, which rod is provided with an ordinary take-up coupling 116 at its connection with the crank 111. Thus, when the cam 107 is moved rearwardly from its normal position (Fig. 22) the gear 110 and crank 111 in connection therewith are actuated and the dispensing valve thereby opened.

Beneath the cam member 107 is pivoted a follower 117 having spaced lugs 118 that bear against the bottom of the cam member which is so shaped as to cause tilting movement of the follower when said member is moved forwardly from neutral position, (Fig. 21) and which is held in its normal position when the cam member is in neutral position or is moved rearwardly therefrom. One end of said follower has connection with the operating rod 119 of the electric switch 120 through which current for the operation of the motor 10 is controlled, so that upon tilting of the follower said switch is closed. The opposite end of the follower 117 is connected with the shifting device 39 (Fig. 36) by means of a rod 121 that is provided with an ordinary take-up coupling 122 at its connection with said follower, whereby the toothed member 38 on the pump shaft is shifted into engagement with the driving member 36 when said follower is tilted.

As a means for preventing unauthorized operation of the dispenser a door 123 is hinged upon a transverse hinge rod 124 and is so shaped as to close the front of the case 48, there being a lock 125 in one side of the case for securing the door when closed. The door has a notch 126 in which the operating lever 52 extends so that operation of the lever is thereby prevented, the notch being located in the door so that it is essential that the operating lever be placed in normal position before the door is closed.

Mechanism for automatically opening the drain back valve upon closing of the door 123 is provided (Figs. 24 and 25) and consists of a spring pressed bolt 127 slidably mounted in the case 48 with its forward end bearing against the adjacent hinge-arm 128 of the door 123, which arm is provided with a notch 129 made therein for the reception of the end of the bolt and so located as to permit forward movement of the bolt when the door is completely closed. Also, a cam lever 130 is mounted upon the end of the hinge rod 124 adjacent the arm 128 of the door and has operative relation with the bolt 127 so that upon swinging of said lever the bolt is moved inwardly so as to clear the arm of the door and permit said door to be opened. The rear end of the bolt 127 has operative connection with a lever 131 pivotally supported at the back of the case 48, which lever has actuating relation with the drain back valve 18, by means of a connecting rod 132, which rod is provided with an ordinary take-up coupling 133 at its connection with said lever. The upper end of the rod 132 has connection with the drain-back valve lever 134 so that the valve is opened when the door 123 is closed and the bolt moves to its forward position, and is closed when the bolt is moved to its rearmost position and the door is open.

The dispenser is equipped with a gauge 136 in connection with its transparent vessel 1, which gauge is of the character of my invention appearing in Patent No. 1,478,328, issued December 18, 1923, for a gauge. In the present instance the level of liquid in the measure at various stages is accurately indicated correspondingly with the respective adjusted positions of the gauge tube 19. Also, the dispenser is equipped with a compensating means 137 in the measuring vessel, which means is similar in character to my former invention appearing in Patent No. 1,401,897, issued December 27, 1921 for measure for dispensing liquids, said compensating means being so proportioned and arranged within the measure as to displace liquid in the spaces between the gauge marks so that the respective quantities of liquid held in the several spaces are of definite predetermined quantities.

Figure 38:
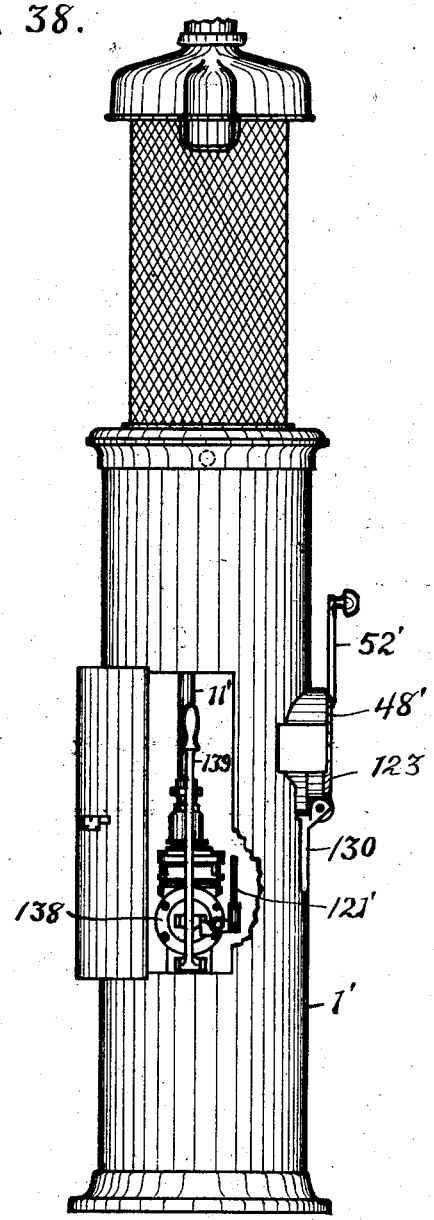
Fig. 38 is a side elevation of a dispenser embodying the invention shown equipped with a hand operated pump.

In the modification of the invention shown in Fig. 38 to Fig. 41 inclusive, a pump 138 is installed in the pedestal 1′, the pump being of the well known reciprocating type operated by a pump handle 139 and being connected with the supply pipe 11′. In this instance a locking member 140 is mounted upon a fulcrum 141 and connected with the follower 117′ by means of the rod 121′ so as to be actuated thereby. The locking member has a hook 142 that has locking engagement with the outer end of the cross head 143 on the pump rod 144 and to which the pump handle 139 is connected, said locking engagement taking place when the cross head reaches the inner end of its stroke (Fig. 40). When the locking member is tilted to the position shown in Fig. 41 and the cross head is moved forwardly from its innermost position over the top of the hook, locking engagement of said hook is thereby prevented until the cross head is again returned to its innermost position.

In utilizing the invention the pump 9 is connected with a source of supply of gasoline (not shown) in the usual manner, so that upon operation of the pump the measuring vessel is filled with gasoline therefrom to the overflow level, any surplus passing into the vessel being eliminated by gravitation through the overflow pipe 13. Operation of the pump is effected by swinging the operating lever 52 inwardly while in upright position which causes the plunger 53 to move outwardly with a corresponding forward movement of the cam member 107 and tilting movement of the follower 117. The tilting of the follower causes closing of the switch 120 and the motor 9 is accordingly actuated, and also the clutch mechanism is thrown into operating engagement through the medium of the connection 121, and thus the pump functions and the measure is supplied with gasoline until the operating lever is released and is returned to normal position. The adjustable stop 91 is then positioned according to the quantity of gasoline to be dispensed, and is held in place by the centering pin 92 that engages in the corresponding aperture. The operating lever is then turned upon the axis of the plunger 53 to the point of contact with the abutment 95 on the adjustable stop, and while thus located the operating lever is swung outwardly and the plunger is accordingly moved inwardly thereby, operation of the lever being allowed by the slot 96. As the operating lever 52 is turned from its upright position toward the stop, the plunger is correspondingly turned upon its axis and the rack bar 67 is lowered through the action of the driving gear 62 and counter-gear 69, and in this manner the gauge tube 19 is lowered in the measuring vessel to a corresponding extent. When the operating lever is against the abutment 95 on the stop, the plunger is moved inwardly by swinging the operating lever outwardly so that the centering pin 66 moves into the alined opening 68 in the rack preventing movement thereof, and the cam member 107 is also moved back through the action of the plunger and driving gear thereon, so that the dispensing valve 22 is opened, thus allowing the liquid in the vessel to flow through the gauge tube into the well and from thence out through the dispensing valve into the hose connection. Before the vessel may be refilled it is necessary to return the operating lever by first swinging it so as to move the plunger outwardly to clear the centering pin from the rack, and then by turning the lever up to its upright position which elevates the gauge tube to a point above the overflow level in the vessel, and so that the lever may then be swung inwardly to effect operation of the motor and clutch. The filling, measuring and dispensing operations are thus controlled entirely by manipulation of the operating lever. By closing the door 123 when the operating lever is in upright or normal position, the lever is thereby prevented from functioning, and the drain valve is accordingly opened so that any liquid in the measure flows back through the return flow pipe to the underground tank.

In the modified form of the invention, as illustrated in Figs. 38 to 41 inclusive, the filling operation is accomplished by swinging the operating lever 52' inwardly so that the plunger is moved outwardly which causes the locking member 140 to tilt so as to admit of operation of the pump, the pumping being accomplished by manipulation of the handle 139. The measuring and dispensing operations are accomplished in the same manner as in the previous instance.

What I claim is:—

1. In a liquid dispensing apparatus, a transparent measure for holding and displaying a quantity of liquid; a filling means for the measure including an electric motor and switch therefor; an emptying means for the measure including a vertically sliding gauge tube and dispensing valve having communication therewith; a controlling mechanism including a handle therefor, having operable relation with said gauge tube, and also operable relative selectively with said dispensing valve and switch, there being interlocking relation between said mechanism and gauge tube when the dispensing valve is operated; and an adjustable stop mechanism for limiting movement of the operating handle when actuated to lower the gauge tube.

2. In a liquid dispensing apparatus, a transparent measure for holding and displaying a quantity of liquid; a pump for filling the measure; controlling means for the pump; an emptying means for the measure including a vertically sliding gauge tube and dispensing valve having communication therewith; an operating mechanism including a handle therefor, having operable relation with said gauge tube, and also operable relation selectively with said dispensing valve and controlling means, there being interlocking relation between said mechanism and gauge tube when the dispensing valve is operated; and an adjustable stop mechanism for limiting movement of the operating handle when actuated to lower the gauge tube.

3. In liquid dispensing apparatus including a stationary vessel provided with a sump, a dispensing valve controlling the discharge outlet of the sump; an adjustable gauge tube in the sump and extending into the measure and operable to regulate the quantity of liquid passing from the vessel into the sump; a drain valve for the vessel; a control box in supported relation with the vessel and having a lock controlled door; a controlling mechanism in said box, having operable relation with said gauge tube and dispensing valve, said door being operable to close said box only when said mechanism is in inoperative position; a spring pressed bolt having locking relation with said door; a connection between said drain-valve and bolt whereby the drain-valve is open when the door is locked; a lever operable when the door is shut for actuating said bolt; and filling means for said vessel controlled by said mechanism and being inoperable when said door is closed.

4. In liquid dispensing apparatus having a stationary vessel and dispensing means including an adjustable gauge tube and dispensing valve, a controlling mechanism having actuating relation with said gauge tube and dispensing valve; and a clutch operated friction device in connection with said controlling mechanism operable to resist movement thereof during the downward stroke of said tube and permitting freedom of movement during the upward stroke thereof, whereby said tube is sustained throughout the various stages of its stroke.

5. In liquid dispensing apparatus having a stationary vessel and an adjustable gauge tube through which liquid is dispensed from the vessel, a mechanism for actuating said tube; a clutch in connection with said mechanism; and a friction device in connection with said clutch and mechanism, operable to resist movement of said mechanism during the downward stroke of said tube and permitting freedom of movement during the upward stroke thereof, whereby said tube is sustained throughout the various stages of its stroke.

6. In liquid dispensing apparatus having a stationary vessel and dispensing means including an adjustable gauge tube, mechanism for actuating said gauge tube; and a clutch operated friction device in connection with said mechanism operable to resist movement thereof during the downward stroke of said tube and permitting freedom of movement during the upward stroke thereof whereby said tube is sustained throughout the various stages of its stroke.

7. In a liquid dispensing apparatus having a stationary vessel and an adjustable gauge tube through which liquid is dispensed from the vessel, a mechanism for raising and lowering said tube; and a friction device operable to counteract the tendency of said tube to move downwardly.

8. In a liquid dispensing apparatus having a stationary vessel and a dispensing means including an adjustable gauge tube and dispensing valve, a rack-bar having operable relation with said tube, and having a rack-bar in operable relation with said tube and having a series of spaced apertures therein; a control box in supported relation with said vessel; a revoluble head in said box; an operating lever in said head upon an axis extending eccentric to and at right angles to the axis of said head; a plunger extending through said head in axial alinement therewith, and engaged by said lever so as to be moved longitudinally in said head; a driving gear fixed on said plunger; a counter gearing engaged with said driving gear, and said rack-bar; a guide adjacent said rack-bar for the rear end of said plunger, which rear end forms a centering pin engageable in the apertures of said rack-bar severally; a spring mechanism in said head for holding said plunger in neutral position; a cam member actuated by said driving gear; a mechanism engaged by the cam member and having actuating relation with said dispensing valve operable when said rack-bar is engaged by said centering pin, and inoperable when said plunger is out of locking relation with said rack-bar; and an adjustable stop mechanism for limiting movement of the operating lever.

9. In a liquid dispensing apparatus having a stationary vessel and a dispensing means including an adjustable gauge tube and dispensing valve, a pumping means for filling the vessel; a control box in supported relation with said vessel; a revoluble head in said box; a plunger in said head disposed in axial alinement therewith and longitudinally movable therein; an operating lever fulcrumed on said head and engaging said plunger and being operable to move said plunger longitudinally or turn said head upon its axis accordingly as actuated; a mechanism actuated by turning movement of said plunger for raising or lowering said gauge tube; a cam member having operative relation with said plunger when said plunger is moved longitudinally; a mutilated gear actuated by longitudinal movement of the plunger in one direction and having operable relation with the dispensing valve; a follower actuated by said cam member when said plunger is moved in the opposite direction, and having means in connection therewith for control of said pumping means; and adjustable stop mechanism engageable with said lever to thereby limit turning movement of said head.

10. In a liquid dispensing apparatus having a stationary vessel and a dispensing means including an adjustable gauge tube and a dispensing valve, a pumping means for filling the vessel; a control means in supported relation with said vessel including an operating lever therefor, and connections whereby said control means has operative relation with and selectively actuates said tube and valve, and control of said pumping means, accordingly as said lever is actuated; mechanism controlled by said lever and related to the tube, pumping means and valve so as to limit downward stroke of the tube and prevent simultaneous operation of said pumping means and the dispensing means and prevent opening of said valve before said tube reaches the end of its downward stroke.

11. In combination with a vessel having an overflow outlet and means for filling the vessel, a dispensing means including a sump beneath the vessel, having an outlet near its upper end; a stuffing box between the vessel and sump; a vent for said sump; a sliding gauge tube extending from said sump through said stuffing box into said vessel; an inverted cup positioned in connection with the top of said tube, the lower perimeter thereof encompassing and being spaced from the upper end of said tube; a float-controlled valve in the top of the cup whereby said cup is vented when submerged and the valve is closed when emerged; and a dispensing valve in connection with the outlet of the sump, the passage-way through said valve being in a plane above that of said outlet.

12. In a liquid dispensing apparatus having a stationary vessel, a sump beneath said vessel, having an outlet near its upper end; a sliding gauge tube in said sump extending into said vessel; an inverted cup positioned over the top of said tube, the lower perimeter of said cup extending in a plane lower than the top of said tube and spaced therefrom, said cup having a vent opening in its top; a float controlled valve for said opening disposed so as to close said opening when emerged; and a dispensing valve in connection with the outlet of said sump, the passage-way through said dispensing valve being disposed in a plane slightly above that of said outlet.

13. In a liquid dispensing apparatus having a vessel with an overflow outlet and a sliding gauge tube through which liquid from said vessel is dispensed, an inverted cup positioned in connection with the top of said tube, the lower perimeter thereof encompassing and being spaced downwardly from the upper end of said tube; and a float controlled valve in the top of the cup whereby said cup is vented when submerged and the valve is closed when emerged.

14. In combination with the structure recited in claim 13, a vented sump beneath said vessel into which the gauge tube extends, and having an outlet opening in its upper portion; and a dispensing valve having connection with the outlet opening of the sump, the opening through said valve being disposed in a plane higher than the outlet opening in the sump.

15. In a liquid dispensing apparatus including a vessel having an overflow outlet and a sliding gauge tube through which liquid from the vessel is dispensed, a mechanism for actuating the gauge tube including a rack-bar movable therewith, an auxiliary rack having limited sliding movement on said rack-bar; a spring for sustaining the auxiliary rack in normal position; a stop engageable with said auxiliary rack operable to prevent movement thereof during the protrusion of said gauge tube above the overflow level in the vessel; and a metering mechanism including a driving pinion therefor, which pinion is actuated by said rack-bar only during the travel of said gauge tube below the overflow level in the vessel, and is prevented by said auxiliary rack from rotating during the protrusion of the gauge tube above said level.

16. In combination with a dispensing apparatus including a vessel having an overflow outlet and a sliding gauge tube through which liquid from the vessel is dispensed, an actuating mechanism for the gauge tube, and a metering device related to said tube so as to be operable during the travel of said gauge tube downwardly below the over-flow level in the vessel, and inoperable when said tube is moved upwardly and during the protrusion thereof above said level.

17. In a liquid dispensing apparatus, a measuring vessel including a pedestal therefor; a filling means for the vessel; means for dispensing liquid from said vessel; a case in connection with the pedestal including a hinged door therefor; control mechanism in said case including an operating handle, having operable relation with said filling and dispensing means; a drain valve for the vessel; a mechanism including connections related with the valve and said door to open the valve when the door is closed, and to prevent opening of the valve when the door is open; and a device for disengaging said mechanism from locking engagement with said door, said control mechanism being inoperable when said door is closed.

18. In a liquid dispensing apparatus having a measuring vessel including a pedestal therefor and filling and dispensing means, a case in connection with the pedestal having a hinged door; control mechanism in said case including an operating handle, for said filling and dispensing means, which mechanism is inoperable when the door is closed and operable when the door is open; a valve controlled drain outlet for the vessel; and mechanism operable to open the valve of said outlet and lock said door when the door is closed, and to hold said valve closed when the door is open.

19. A liquid dispensing apparatus including a measuring vessel; a dispensing means in connection with said vessel; a pump for filling said vessel; a clutch mechanism, one member of which has splined relation with the shaft of said pump; a motor having actuating relation with the other member of said clutch; a switch for said pump; and a control mechanism including an operating handle and connections respectively with said dispensing means, switch and clutch mechanism so arranged that the switch is closed and the clutch is engaged, or the dispensing means is operated accordingly as said handle is actuated.

20. A liquid dispensing apparatus including a measuring vessel; a dispensing means for the vessel including a sliding gauge tube and valve through which liquid from the vessel is dispensed; a filling means for the vessel including a motor driven pump; a switch for said motor; and a control mechanism including an operating handle and connections respectively with the gauge tube, valve and switch, whereby said tube, valve and switch are operated selectively accordingly as said handle is actuated.

21. A liquid dispensing apparatus including a measuring vessel; a dispensing means for the vessel including a sliding gauge tube and valve through which liquid from the vessel is dispensed; a filling means for the vessel including a motor driven pump; a switch for said motor; a single operating handle; and mechanism, actuated by the handle, and related with the gauge tube, valve and switch to effect operation thereof independently of each other accordingly as said handle is manipulated.

22. A liquid dispensing apparatus including a measuring vessel; a dispensing means for the vessel including a sliding gauge tube and valve through which liquid from the vessel is dispensed; a pump for filling said vessel; a single operating handle and related to the gauge tube, valve and pump to effect independent operation of any one thereof and prevent simultaneous operation of any two thereof.

23. In liquid dispensing apparatus, a transparent measure for liquid; a pumping means for filling the measure; an emptying means for the measure including a vertically sliding gauge tube and a dispensing valve having communication therewith; a mechanism having an operating handle, related with said tube, valve and pumping means so that said tube and valve are selectively operated accordingly as said handle is actuated, and said pumping means is out of action when either the tube is actuated or the valve is operated, there being interlocking relation between said mechanism and tube when the valve is operated; and an adjustable stop mechanism for limiting movement of the operating handle when actuated to lower the gauge tube.

24. In liquid dispensing apparatus, a transverse measure; a sump beneath the measure; a sliding tube in the sump extending into the measure; a dispensing valve controlling the discharge outlet of the sump; a pumping means for filling the measure; a mechanism including an operating handle, related with said tube, valve and pumping means so that said tube and valve are selectively operated accordingly as said handle is actuated, and said pumping means is out of action when either the tube is actuated or the valve is opened; and an adjustable stop mechanism for limiting movement of the operating handle when actuated to lower said tube.

25. In liquid dispensing apparatus, a transparent measure including a sump therefor; a sliding gauge tube extending from the sump into the measure; a dispensing valve controlling the discharge outlet of the sump; a filling means for the measure; a mechanism having an operating handle, related with said tube, valve and filling means so that said tube and valve are selectively operable accordingly as the handle is actuated, and said filling means is out of action when either the tube is in action or the valve is open; and adjustable stop mechanism having engagement with said handle to thereby limit its action in lowering said tube, and being operable to prevent said handle from being operated to open said valve until said handle has reached the limit of its action in lowering said tube.

26. In liquid dispensing apparatus having a display measure provided with a sump; a dispensing valve controlling the discharge outlet of the sump; a sliding gauge tube in the sump extending into the measure for controlling the outlet of liquid therefrom; a rack-bar having actuating connection with said tube; a filling means for said measure; a controlling mechanism having an operating handle, related with said rack-bar, valve and filling means so that said rack-bar and valve are selectively operated accordingly as the handle is actuated, and said filling means is out of action when either the rack-bar is actuated or said valve is open, and having locking engagement with said rack-bar while said valve is open; and adjustable stop mechanism having engagement with said controlling mechanism to thereby limit its action in driving said rack-bar and being operable to prevent action of said controlling mechanism in opening said valve until locked relation with said rack-bar is established.

27. In liquid dispensing apparatus including a transparent measure provided with a sump, a dispensing valve controlling the discharge outlet of the sump; a sliding gauge tube in the sump extending into the measure for controlling the discharge outlet of liquid from said measure; a rack-bar having spaced apertures and actuating connection with said tube; a filling means for said measure; a controlling mechanism having an operating handle, related with said rack-bar, valve and filling means so that said rack-bar and the valve are selectively operated accordingly as the handle is actuated, and said filling means is out of action when either the rack-bar is actuated or the valve is open; a centering pin in connection with said controlling mechanism engageable severally in the apertures of said rack-bar accordingly as the rack-bar is positioned by said mechanism, whereby said rack-bar is locked upon operation of said handle to open the dispensing valve; and a stop limiting movement of said mechanism in driving said rack-bar.

In testimony whereof I affix my signature.

FRANK B. EILERS.